United States Patent
Surkov et al.

(10) Patent No.: US 11,640,583 B2
(45) Date of Patent: May 2, 2023

(54) GENERATION OF USER PROFILE FROM SOURCE CODE

(71) Applicant: Interviewstreet Incorporation, Mountain View, CA (US)

(72) Inventors: Sergey Surkov, Foster City, CA (US); Ryan Osilla, Mountain View, CA (US); Liubov Yaronskaya, Moscow (RU)

(73) Assignee: Interviewstreet Incorporation, Mountain View, CA (US)

( * ) Notice: Subject to any disclaimer, the term of this patent is extended or adjusted under 35 U.S.C. 154(b) by 173 days.

(21) Appl. No.: 15/853,500

(22) Filed: Dec. 22, 2017

(65) Prior Publication Data

US 2019/0050814 A1 Feb. 14, 2019

Related U.S. Application Data

(60) Provisional application No. 62/542,536, filed on Aug. 8, 2017.

(51) Int. Cl.
*G06Q 10/10* (2012.01)
*H04L 9/40* (2022.01)
(Continued)

(52) U.S. Cl.
CPC ........... *G06Q 10/1053* (2013.01); *G06F 8/77* (2013.01); *G06F 21/6245* (2013.01);
(Continued)

(58) Field of Classification Search
CPC .............. G06Q 10/105; G06Q 10/1053; Y10S 707/947; G06F 21/6245; G06F 8/71; G06T 11/20; H04L 63/105; H04L 67/306
See application file for complete search history.

(56) References Cited

U.S. PATENT DOCUMENTS

2003/0056151 A1* 3/2003 Makiyama .......... G06F 11/3604
714/38.1
2013/0290207 A1* 10/2013 Bonmassar ............ G06Q 10/06
705/321
(Continued)

OTHER PUBLICATIONS

Git Hompage, archived Jul. 17, 2017; available at: https://web.archive.org/web/20170717022929/https://git-scm.com/ (Year: 2017).*
(Continued)

*Primary Examiner* — Lynda Jasmin
*Assistant Examiner* — Brendan S O'Shea
(74) *Attorney, Agent, or Firm* — Van Pelt, Yi & James LLP

(57) ABSTRACT

A user profile may be generating from a source accordingly to embodiments of the present disclosure. In some embodiments, a process (e.g., implemented by a client) includes obtaining a set of commits associated with a user from a source code version control system, extracting at least one signal from the set of commits, obfuscating the signal(s), and outputting the obfuscated signal(s). In some embodiments, a process (e.g., implemented by a server) includes receiving a signal associated with source code, where the signal is extracted from a commit obtained via a source code version control system. The process further includes aggregating the signal with at least one other signal, generating a user profile based at least on part on the aggregated signals, and rendering the user profile on a graphical user interface.

12 Claims, 16 Drawing Sheets

(51) Int. Cl.
  *G06F 21/62*    (2013.01)
  *H04L 67/306*    (2022.01)
  *G06T 11/20*    (2006.01)
  *G06N 20/00*    (2019.01)
  *G06F 8/77*    (2018.01)
  *G06Q 10/1053*    (2023.01)
  *G06F 8/71*    (2018.01)

(52) U.S. Cl.
  CPC ......... *G06F 21/6254* (2013.01); *G06N 20/00* (2019.01); *G06T 11/20* (2013.01); *G06T 11/206* (2013.01); *H04L 63/105* (2013.01); *H04L 67/306* (2013.01); *G06F 8/71* (2013.01); *G06T 2200/24* (2013.01)

(56) References Cited

U.S. PATENT DOCUMENTS

| | | | | |
|---|---|---|---|---|
| 2014/0325490 | A1* | 10/2014 | Wiener | G06F 8/42 717/131 |
| 2015/0058278 | A1* | 2/2015 | Fankhauser | G06F 16/215 707/602 |
| 2015/0347756 | A1* | 12/2015 | Hidayat | G06F 21/57 726/22 |
| 2016/0308999 | A1* | 10/2016 | Bonmassar | H04L 67/327 |

OTHER PUBLICATIONS

Burgdorf, Christoph "The anatomy of a Git commit" Thoughram Blog, Nov. 18, 2014; available at: https://blog.thoughtram.io/git/2014/11/18/the-anatomy-of-a-git-commit.html (Year: 2014).*

"Learn Version Control with Git" by Tower as archived Feb. 13, 2017; available at: https://web.archive.org/web/20170213214218/https://www.git-tower.com/learn/git/ebook/en/command-line/advanced-topics/diffs (Year: 2017).*

Robert "Color Coded Bar Charts with Microsoft Excel" Clearly and Simply, Aug. 15, 2011; available at: https://www.clearlyandsimply.com/clearly_and_simply/2011/08/color-coded-bar-charts-with-microsoft-excel.html (Year: 2011).*

"Why Code Churn Matters" Pluralsight, Nov. 15, 2016; available at: https://www.pluralsight.com/blog/teams/why-code-churn-matters (Year: 2016).*

"Java (programming language)" Wikipedia, as archived Mar. 17, 2017; available at: https://web.archive.org/web/20170317162655/https://en.wikipedia.org/wiki/Java_(programming_language) (Year: 2017).*

Baker, Martin "Programming Languages for 3d simulation and games" Euclidean Space as archived Mar. 6, 2017; available at: https://web.archive.org/web/20170306235447/https://www.euclideanspace.com/software/language/index.htm (Year: 2017).*

Capiluppi, Andrea, Alexander Serebrenik, and Leif Singer. "Assessing technical candidates on the social web." IEEE software 30.1 (2012): 45-51. (Year: 2012).*

Casalnuovo, Casey, et al. "Gitcproc: A tool for processing and classifying github commits." Proceedings of the 26th ACM SIGSOFT International Symposium on Software Testing and Analysis. 2017. (Year: 2017).*

* cited by examiner

100

600

500

PROJECT A – grocerybill.py

COMMITS MADE ON OCTOBER 4, 2017

User Alice updated price of 'orange'
User Bob added "tax" call to declare and define ...

CODE: 1 CHANGED FILE WITH 3 DELETIONS AND 2 ADDITIONS

```
101 -prices = {'orange': 0.40, 'lemon': 0.50}
101 +prices = {'orange': 0.80, 'lemon': 0.50}
102 102 purchase = {
103 103         'orange': 1,
104 104         'lemon': 3}
105 105 grocery_bill = sum(prices[fruit] * purchase[fruit]
                                    for fruit in purchase)
106 106
107 107 print 'Total: $%.2f' % grocery_bill
```

Tech — 5 repos (2013 - 2017)
Last updated: 2017/06/10 - 10:30:00   4

Machine learning — 20 - 50 commits (30 qommits)

| TensorFl. ● | Dlib ● | MLPACK ● |
| 130 loc | 230 loc | 30 loc |

Computer vision — 350 - 400 commits (30 qommits)

| OpenCV ● |
| 321 loc |

Web development — 10 - 30 commits (10 qommits)

| Django ● | Ruby on Rails ● | JQuery ● | Google charts ● |
| 130 loc | 230 loc | 30 loc | 30 loc |

Work experience

| | |
|---|---|
| CTO and Co Founder<br>Ditto Technologies<br>2017/06/10 | I'm Sergey Surkov, a programmer based in San Fransisco, The Netherlands. I create interfaces, shape brands and build digital products.<br>    Over the last ten odd years I've had the pleasure of working with some great companies, working side by side to design and develop new apps and improve upon existing products... I mainly focus on designing clear, understandable interfaces and creating |
| Partner<br>Graphical Networks<br>2017/06/10 | I'm Sergey Surkov, a programmer based in San Fransisco, The Netherlands. I create interfaces, shape brands and build digital products.<br>    Over the last ten odd years I've had the pleasure of working with some great companies, working side by side to design and develop new apps and improve upon existing products... I mainly focus on designing clear, understandable interfaces and creating |
| Software Engineer<br>Google<br>2017/06/10 | I'm Sergey Surkov, a programmer based in San Fransisco, The Netherlands. I create interfaces, shape brands and build digital products.<br>    Over the last ten odd years I've had the pleasure of working with some great companies, working side by side to design and develop new apps and improve upon existing products... I mainly focus on designing clear, understandable interfaces and creating |

FIG. 8G

Connections 870

Coming soon

Career Path

Front end —— Ruby Dev —— Computer vision

Coming soon

Sergey Surkov
@angrycoyote
Co-founder of Sourcerer
sergeysurkov@gmail.com
Foster City, CA

| | Member:<br>000000001 |
|---|---|
| (qommits):<br>12435 | Commits:<br>1232321 |
| Repos:<br>203 | Locs:<br>405 |

920

Language
5 repos (2013 - 2017)
Last updated: 2017/06/10 - 10:30:00

| C++ | Python |
|---|---|
| Commits:<br>120652 | Commits:<br>120652 |
| (qommits):<br>23452 | (qommits):<br>23452 |
| Locs:<br>547 | Locs:<br>547 |
| Ruby | Javascript |
| Commits:<br>120652 | Commits:<br>120652 |
| (qommits):<br>23452 | (qommits):<br>23452 |
| Locs:<br>547 | Locs:<br>547 |

Languages

1000

US 11,640,583 B2

GENERATION OF USER PROFILE FROM SOURCE CODE

CROSS REFERENCE TO OTHER APPLICATIONS

This application claims priority to U.S. Provisional Patent Application No. 62/542,536 entitled GENERATION OF USER PROFILE FROM SOURCE CODE filed Aug. 8, 2017 which is incorporated herein by reference for all purposes.

BACKGROUND OF THE INVENTION

An understanding of an engineer's programming style and assessment of the engineer's ability may be useful for a variety of purposes including finding a role appropriate for the engineer. For example, when an engineer is being considered for promotion or reassignment or a job candidate is being assessed, a quick and easy way to understand the engineer's skills and areas of expertise may be useful. Currently, it is difficult to assess an engineer's ability and get a sense of his or her programming style without deeply assessing the engineer's work product such as examining source code written by the engineer. Conventionally, an engineer is assessed by another human such as a manager or committee of experts in the area. This process of evaluating an engineer can be slow, inefficient, and not insightful.

BRIEF DESCRIPTION OF THE DRAWINGS

Various embodiments of the invention are disclosed in the following detailed description and the accompanying drawings.

FIG. 7 illustrates an example of a commit obtained in some embodiments.

FIG. 8C shows an example user profile rendered on a graphical user interface.

FIG. 8G shows an example user profile rendered on a graphical user interface.

FIG. 8H shows an example user profile rendered on a graphical user interface.

DETAILED DESCRIPTION

Figure 1:
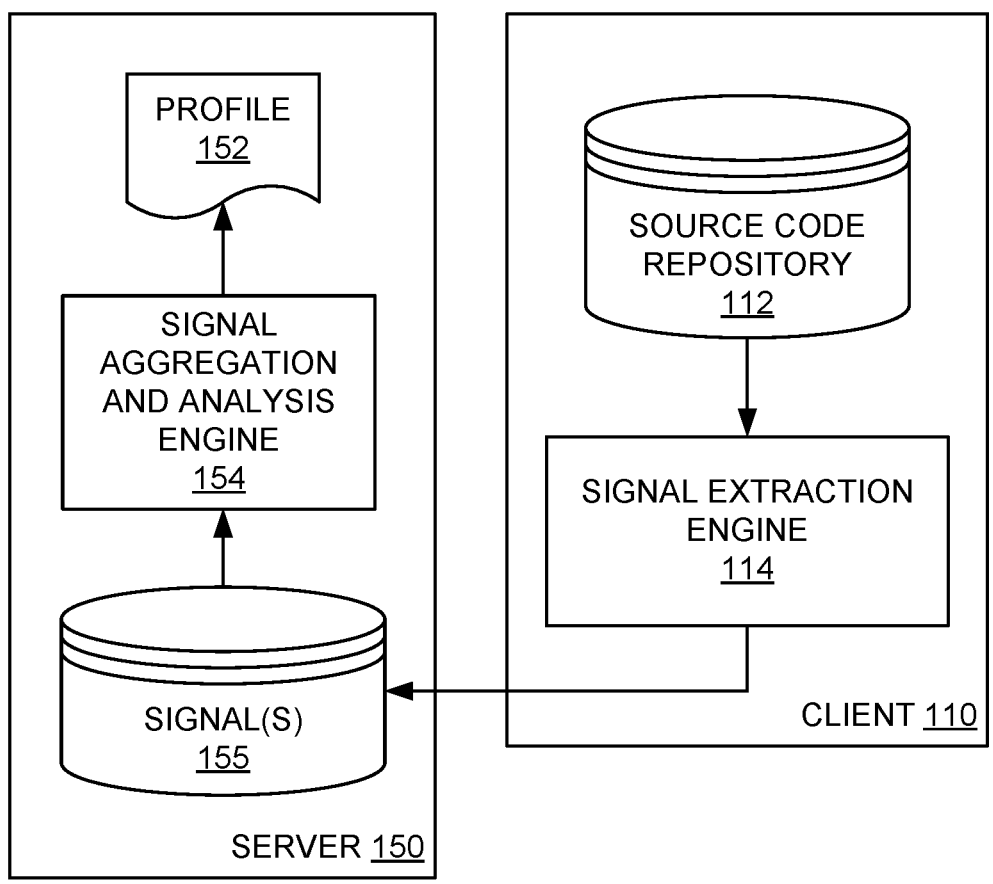
FIG. 1 is a block diagram illustrating an embodiment of a system for generating a user profile from source code.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of generation of a user profile from source code are described herein. The user profile can be programmatically generated by a processor by examining source code produced by the engineer. The engineer's authoring style, areas of expertise, ability, and the like may be assessed and characterized and output in the form of a user profile. The source code may be retrieved from a distributed version control system as will be more fully discussed below.

In various embodiments, a system such as a signal extraction program installed at a client device is configured to obtain one or more commits associated with a user from a source code version control system. For example, the system may analyze one or more version control repositories such as Git. The system may extract at least one signal from the set of commits. For example, the system may collect information based at least in part on the one or more repositories. The system may collect at least one of the following example signals: information about tools the engineers used, libraries, technologies, commit frequency, information about lifetime of code they write, their interactions with their teams, coding style they use, and other facts and metrics. The system may obfuscate the at least one signal and output the obfuscated signal to a remote server. The server may use the received signal to automatically generate a profile. In various embodiments, the received signal may be aggregated with one or more other signals, and a user profile may be generated based at least in part on the aggregated signals. One or more profiles may be generated based at least in part on the collected information and rendered on a graphical user interface. The profile may be associated with a user and be descriptive of the user's skills and experiences.

FIG. 1 is a block diagram illustrating an embodiment of a system for generating a user profile from source code. The example system 100 includes a client 110 and a server 150.

In this example, the client 110 includes a source code repository 112 and a signal extraction engine 114. The client 110 may be implemented by a processing device such as the computer system 1000 in FIG. 10. The client may have one or more associated users. The users may be contributors to source code. The source code to which the user contribute may be stored locally in source code repository 112, and signals may be extracted from the source code stored in the source code repository 112 as more fully described herein.

The source code repository 112 may be configured to store documents such as source code. The source code stored by the source code repository can be modified over time by one or more contributors. In some embodiments, the source code repository stores a local copy of code corresponding to a project for which a user of the client is a contributor. For example, the user may be a contributor to a project and have at least a portion of the project source code stored locally at the client in the source code repository 112. In some embodiments, source code for more than one project may be stored in the source code repository 112. The source code repository may be implemented by one or more storage devices. Project source code may be stored in a respective partition of one storage device or may be stored separately in several storage devices. In some embodiments, the source code repository may be configured to store one or more proprietary repositories or non-proprietary repositories.

In some embodiments, the source code repository implements a component of a distributed version control system. In a distributed version control system (sometimes called "Git-style version control system"), a copy of an entire source code repository is stored at each node that is part of the version control system. In other words, if there are multiple contributors to a project, each of the contributors has a copy of the project source code stored locally on her device. When updates such as commits are made to the project by any contributor, the updates are synced with each of the other contributors' devices such that each contributor maintains a copy of the entire project and history of changes locally.

The source code repository 112 may be configured to store updates to source code, which are called "commits." A commit adds changes to source code in a repository, making these changes part of the latest revision of the repository. A commit may be useful for determining changes between versions of code. An example of a commit is shown in FIG. 7.

The signal extraction engine 114 may be communicatively coupled to the source code repository 112 and configured to extract signals from the source code repository. For example, the signals may include facts, metrics, and the like derived from a document such as source code. In some embodiments, the signals extracted from the source code repository includes one or more commits. In some embodiments, client 110 extracts a copy of source code as needed. For example, client 110 may access a remote source code repository to obtain relevant signals requested by a signal extraction engine. The signals may be extracted according to the processes further described herein such as the processes shown in FIGS. 3, 5, and 6.

The signal extraction engine 114 may be configured to output the signal. For example, the signal may be output to a remote database, transmitted over a network, written to memory, etc. In various embodiments, the signal extraction engine is provided on a client such that signals and source code are analyzed at least in part locally without needing to transmit proprietary aspects of the signals or source code.

In some embodiments, the signal extraction engine 114 is configured to provide one or more security features for the extracted signals prior to outputting the signal. This may, among other things, prevent proprietary information from being exposed. For example, the signal may be encrypted prior to transmission such as by RSA, AES, ECC and the like. As another example, the signal may be obfuscated such that the signal becomes disassociated with its source commit. In other words, after obfuscation it becomes impossible to derive a specific commit from which the signal is generated. In one aspect, this ensures that information that project leaders wish to keep within project members or within an organization is not transmitted outside a circle of trust. The circle of trust may be defined by the project leaders. Although in various embodiments, even though the sensitive information is not distributed outside the project contributors, meaningful information can nevertheless be determined and added to a user profile, as further described herein.

In this example, the server 150 includes a signal database 155, a signal aggregation and analysis engine 154, and a profile 152. The server 150 may be provided in a cloud, remotely from the client, or on-premises at a customer location.

The signal database 155 may be configured to store signals received from client 110. The signals may be signals collected at the client 110. A signal may be associated with one or more users. For example, when a user modifies source code, signals derived from the modification may be associated with the user. A signal may be associated with a project. For example, a signal derived from source code of a particular project may be stored for the associated project.

In some embodiments, the signals stored in the signal database cannot be traced to their underlying source code. For example, the signal is obfuscated prior to transmission to server 150 for storage, as further described herein. In some embodiments, the signals include raw signals. For example, signals from non-proprietary projects may be transmitted to the server. The signal database may store the signals and provide the signals for analysis. For example, if the server has better computational power compared with a client device, signals may be sent to the server to perform processing of the signals.

The signal aggregation and analysis engine 154 may be configured to aggregate and/or analyze signals. At least some of the signals may be aggregated from various sources. For example, signals may be collected over time. Signals associated with a particular user may be aggregated for the user and output in a profile describing the user. In some embodiments, changes in signals may be reflected by the user profile as change in experience and/or expertise. As another example, signals may be collected over time for a project. Data analytics may be performed for the project. Signals may be aggregated and analyzed in a manner to accurately reflect an engineer's skill in the engineer's profile. An example of a user profile is shown in FIGS. 8A-8H and FIGS. 9A-9D. In various embodiments, the signals may be aggregated according to the processes further described herein, e.g., with respect to FIG. 4.

In some embodiments, the signal aggregation and analysis engine 154 is configured to reconcile signals. Signals obtained from different sources, which might be inconsistent are reconciled. For example, several signals may be obtained for the same user. As another example, several signals may be obtained for each user. Suppose a repository has two contributors, both of whom have a signal extraction program installed. The two contributors may store local copies of a master project source code on each of their devices. Sometimes, this may result in different signals being picked up for example if there are local differences. The data may be deduped to reconcile the differences caused by the local differences.

In some embodiments, the signal aggregation and analysis engine 154 is able to update a profile for a user who does not have the signal extraction program installed on the user's local client device. Referring again to the example above in which a repository has two contributors, both of whom have a signal extraction program installed on their respective local client devices, when one of the contributors modifies the repository, this may affect the other contributor. For example, this may cause the other contributor's profile to be updated. If one of the contributors stops using the signal extraction program, the other one may continue updating profiles for both users as long as there is access to the project source code. For distributed version control system, there is access to the project source code as long as at least one active contributor has the signal extraction program installed.

In another aspect, various contributors may have respective trust scores which may differ from one other. For example, one contributor may have a different trust score from another contributor. Various repositories may have respective trust scores that differ from one another. The trust score of a repository may be based on an aggregation of a plurality of trust scores. In some embodiments, the trust score associated with a repository may also be determined based on how many users use that repository. For example, in some embodiments, signals from low trust repositories are assigned lower weights in aggregated data/signals. Effectively, in some embodiments, when aggregating signals from numerous sources, more trustworthy sources are given more weight than less trustworthy ones. In various embodiments, the trust scores maybe used to reconcile signals in case of conflict. For example, a signal connected with a source having a hiring trust score may be more heavily weighted than a signal connected with a source having a lower trust score. In some instances, a signal coming from a source with a higher trust score may be used instead of a conflicting signal coming from a source with a lower trust score.

In another aspect, an aggregation of signals may take into account permissions. For example, repository-level permissions such as "public," "coworkers," "private," and the like may be set for a repository. In various embodiments, aggregation is performed per repository, and displayed on a profile with an appropriate (e.g., selectable by a user) level of permissions.

Figure 4:
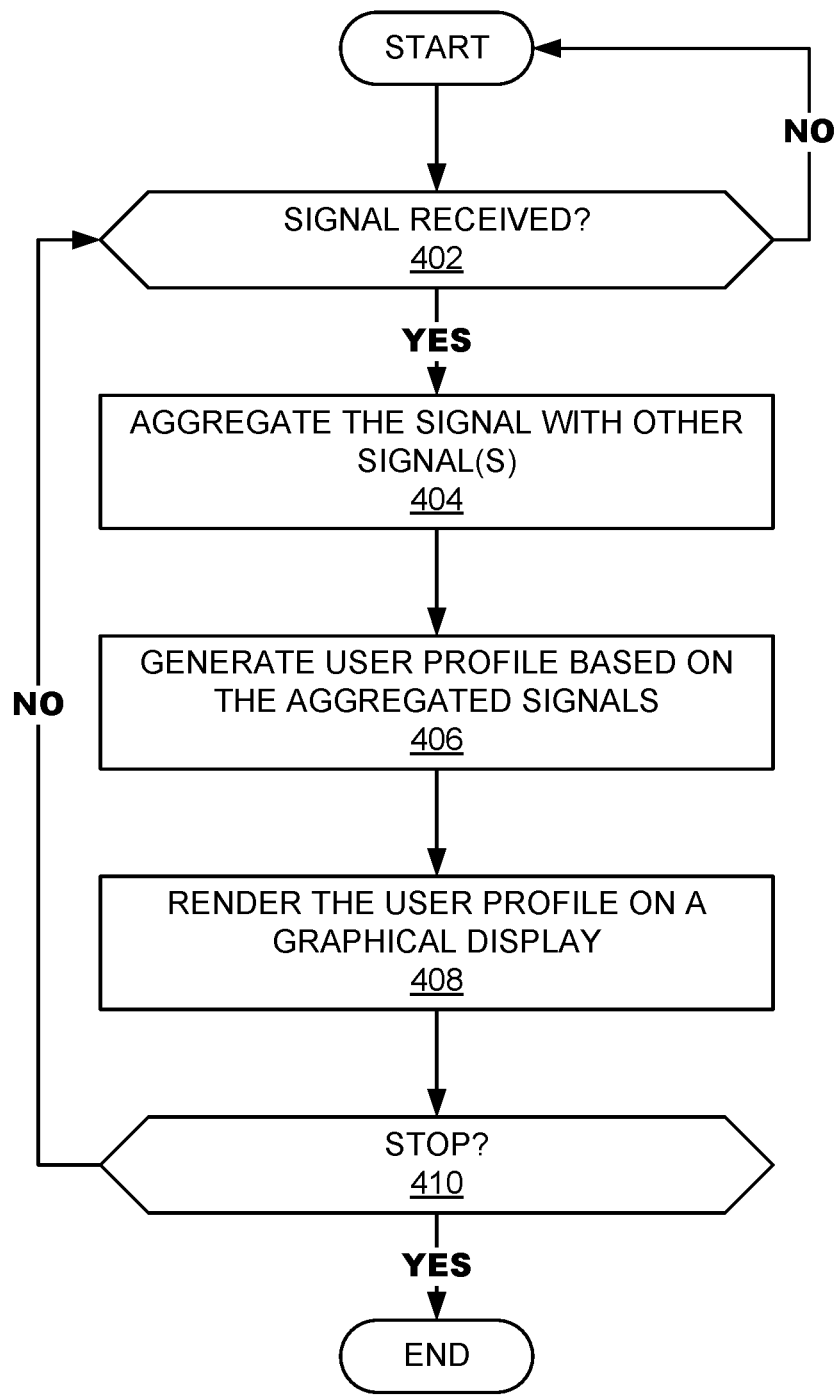
FIG. 4 is a flow chart illustrating an embodiment of a process for generating a user profile from source code.

The signal aggregation and analysis engine 154 may be configured to generate a profile 152 based at least in part on the analysis and aggregation of one or more signals. The profile may provide information about an engineer's ability and experience. Upon generation of the profile, a user may modify the profile. For example, once a user profile is generated, the user is provided with an opportunity to edit the profile by, among other things, deleting some of the information and rearranging the information in a way that presents the user in a desired way such as according to the user's preferences. The profile may be distributed or viewed via a social network or marketplace for referrals and hiring. An example of a profile is shown in FIGS. 8A-8H and FIGS. 9A-9D. An example process for generating a profile is shown in FIG. 4.

In operation, signal extraction engine 114 extracts various signals (e.g., facts and metrics) from source code repository 112. The signal extraction engine 114 may upload the extracted signals to the server 150. In some embodiments, the extract signals may be obfuscated prior to transmission to the server. The signals may be stored in signal database 155. The signals may then be aggregated across one or more repositories, and a profile 152 may be generated from the signals.

Processing the signals locally by signal extraction engine 114 in the manner described herein may have numerous advantages. By way of a non-limiting example, local signal collection allows source code to be kept on the network, reduces the amount of processing power needed to provide the service, and allows a user to preview extracted information. When source code is kept on the network, potentially proprietary source code may be stored within the network, which ensures safekeeping of the source code. For example, an employer can keep its employee's source code within its own network. Allowing a user to preview extracted information such as information displayed in a profile before the information uploaded for profile generation helps users to have confidence that no proprietary information is leaked.

In various embodiments, signals can be extracted from various (not necessarily local) repositories. For example, public or non-public repositories can be downloaded from places like Github with a user's consent. Signal collection may then be performed, for example, in the cloud by a processing platform. Referring to FIG. 1, source code repository 112 may be downloaded from a source (not necessarily a local source), then processed by a signal aggregation and analysis engine 154 in the cloud.

Figure 2A:
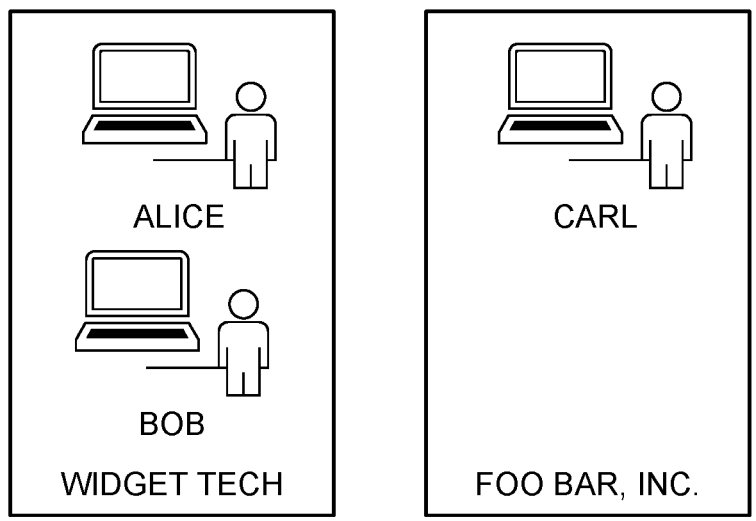
FIG. 2A is a block diagram illustrating an embodiment of a first state of a distributed version control system.

FIG. 2A is a block diagram illustrating an embodiment of a first state of a distributed version control system. In various embodiments, the system uses an invitation flow for user acquisition in a distributed version control system such as the one shown in FIG. 2A. The invitation flow may be viral when used with a distributed source control system such as Git. For example, a distributed source control system makes the entire repository history including all historical commits available on an engineer's machine. The system may be configured to explore such history to determine which team members are close coworkers with the engineer's client device who runs the signal extraction program, and proposes the engineer to invite these coworkers into the system. Once the engineer agrees, the system in various embodiments automatically creates coworker profiles based on their commits. The system may include the coworker's profile in an invitation message, which may make the invitation message more appealing and increases the likelihood that the coworker will enroll in the system.

In this example, Alice and Bob work for Widget Tech and Carl works for Foo Bar Inc. Source code within an organization is accessible by employees of that organization. Here, Alice and Bob can collaborate on projects together within Widget Tech Carl does not work for Widget Tech, and thus cannot access source code for Widget Tech.

Suppose Alice and Bob work on a project together using a Git-style version control system. As more fully explained herein, a distributed version control system provides a complete copy of project source code and a complete history of revisions in each of Alice's and Bob's devices. Contributions to the project made by Alice are also visible in Bob's local copy of the project source code when Bob's local copy gets updated. This means that Alice's and Bob's changes to Widget Tech's repository allows updates to each of their respective profiles. In some cases, a profile may be updated for a contributor who has not signed up for the profile generation system. The generation of a meaningful profile from project data may encourage a project contributor to adopt or install the profile generation system.

Suppose Bob has signed up for a program to generate a user profile for him based on source code he has worked on. For example, Bob has installed an application having a signal extraction engine such as signal extraction engine 114 of FIG. 1 on his device. In one aspect, this allows the signal extraction engine to extract signals relevant for creating his user profile. In another aspect, this allows the signal extraction engine to extract signals for other contributors to the project including contributors who have signed up for user profile generation and contributors who have not signed up for user profile generation. Signals may be extracted for contributors who have not signed up to have a user profile generated by using a local source code repository of a contributor. Referring to FIG. 2A, suppose Alice is not signed up for a user profile. A user profile may nevertheless be generated for Alice because Alice and Bob are both working on the same project. Commits associated with Alice may be used to generate a user profile for Alice because Bob has granted access to the local copy of the code repository on the device. In a distributed version control system, Bob's copy is a complete copy of the project source code. The invitation flow described herein may facilitate spread and adoption of the user profile generation system because substantive profiles may be generated for contributors to the project so long as at least one contributor to the project has provided access to the project repository. In various embodiments, the user profile generation system is incorporated into a social media network and includes invitation features allowing a user to invite others to adopt the user profile generation system. For example, Bob can invite Alice to join, and Alice may be presented with a user profile that has been generated based at least in part on Alice's contribution to the project.

Figure 2B:
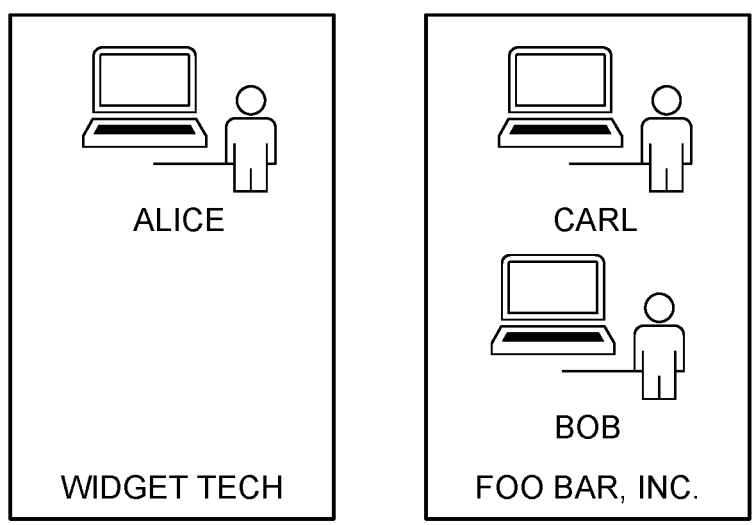
FIG. 2B is a block diagram illustrating an embodiment of a second state of a distributed version control system.

FIG. 2B is a block diagram illustrating an embodiment of a second state of a distributed version control system. In this example, Bob has left Widget Tech and now works for Foo Bar Inc. Here, Bob and Carl can collaborate on projects together within Foo Bar Inc. Alice does not work for Foo Bar Inc., and thus cannot access source code for Foo Bar Inc. Bob's and Carl's changes to Foo Bar Inc.'s repository allow updates to each of their respective profiles, even if Carl is not a user of the profile generating system. Thus, as Bob moves from company to company or project to project and accesses more project repositories, he helps to generate user profiles for potential users. This allows the profile generation system to be virally spread in the marketplace.

Figure 3:
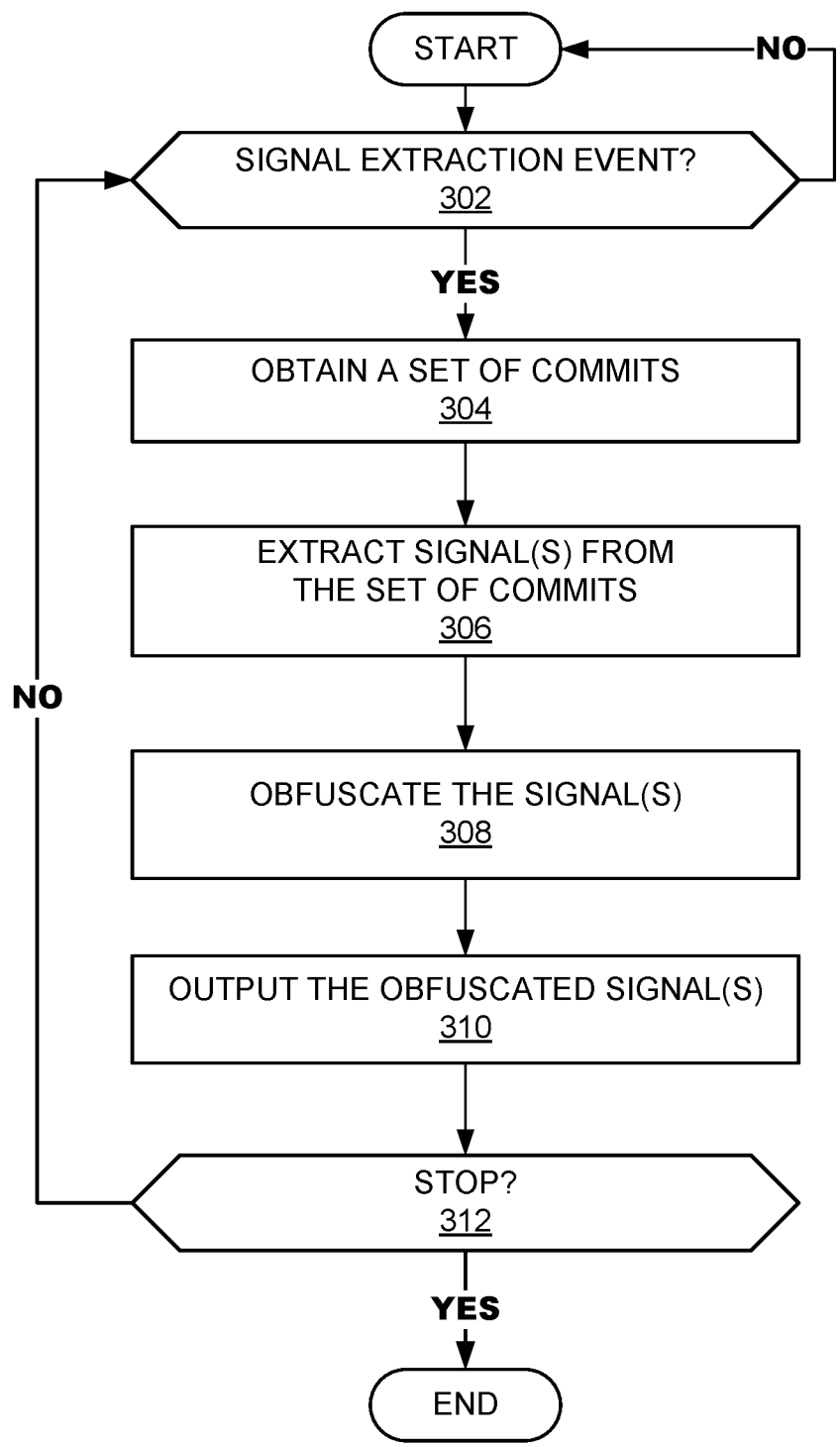
FIG. 3 is a flow chart illustrating an embodiment of a process for extracting and processing a signal from a version control system.

FIG. 3 is a flow chart illustrating an embodiment of a process for extracting and processing a signal from a version control system. In one aspect, process 300 allows code to be analyzed securely and meaningfully without transmitting information not desired to be transmitted to a remote destination. Process 300 may be implemented on a device such as client 110 shown in FIG. 1 or computer system 1000 shown in FIG. 10.

The process begins by determining whether there is a signal extraction event (302). A signal extraction event refers to a trigger the causes a signal from source code to be processed. For example, in response to detection of a commit made to a source code, signal extraction commences. The trigger may be a specific event such as code check-in, code commits, and the like. The trigger may be a related to time such as scheduled maintenance or the passage of time. For example, a signal extraction event may be detected as part of routine maintenance of code. For example, signal extraction may be performed periodically such as every few days. An event such as a threshold number of days being met may cause signal extraction to begin. In some embodiments, commits may be obtained periodically such as every few days. In response to the commits being obtained, signal extraction may be performed.

If there is no signal extraction event, the process returns to the beginning and continues monitoring. If there is a signal extraction event, the process proceeds to 304 in which a set of commits is obtained. A set of commits may be obtained from a document such as source code. An example of a commit is shown in FIG. 7.

The process obtains a set of commits (304). The set of commits may include one or more commits, where a commit is a modification of source code. For example, one or more lines of code may be modified by an author and stored as a commit. A commit includes information about changes to the code such as who made the change, when the change was made, and the portion of code affected by the modification. An example of a commit is shown in FIG. 7. A set of commits may be obtained in response to a commit being made to a code repository. A set of commits may be obtained as part of routine maintenance of a code repository. For example, at the end of each day, a set of commits may be obtained and processed according to process 300. In some embodiments, the set of commits obtained includes all commits for a project on certain occasions, such as when there is a major software update.

One or more signals is extracted from the set of commits (306). The signal(s) may be extracted from source code and/or source control system metadata. The signal(s) may be processed to determine facts, features, and/or metrics associated with the set of commits and underlying code. For example, the signal(s) may be analyzed to determine one or more code features. By way of non-limiting example, code features include:

author (e.g., name and/or email);
    timestamp;
    number of lines associated with the commit;
    languages used;
    technologies used;
    libraries used;
    code longevity;
    team interaction;
    unit testing, such as percentage of commits that contains unit tests;
    quality of a commit;
    credibility of a commit;
    introduction of new thinking; and/or
    miscellaneous metrics.

The extracted signals and/or accompanying facts, features, and/or metrics may be indicative of the author's experience, expertise, and skills. The number of lines associated with a commit may include a number of lines added and/or removed for the commit. In some embodiments, the number of lines affected may be used to score or evaluate a user. For example, more lines of code added means the code is more likely to break, and the engineer might be less skilled compared with an engineer who adds fewer lines of code.

The languages used in a commit may be tracked to indicate language that an author often works with. Frequent use of a language may indicate comfort with that language or an area of expertise. By way of non-limiting example, use of JavaScript and HTML may indicate experience in front-end development, use of C++ and Java may indicate experience in back-end development, and use of Verilog may indicate experience in hardware development.

The technology (e.g., machine learning, graphics, security, etc.) associated with a commit may be detected. In various embodiments, for a given commit, the system may detect one or more technologies used by the engineer who authored the commit. For example, some libraries or languages are used for specific technologies. The languages or libraries used may indicate the author's experience in areas such as machine learning, graphics, security, etc. Techniques for technology detection include library attribution and open source similarity attribution, and the like.

The libraries used in a commit (sometimes called "library attribution") may indicate familiarity with various technologies. An engineer's use of a library in a particular technological field may indicate experience in that field. For example, use of OpenCV suggests that the engineer is familiar with computer vision. Use of TensorFlow suggests that the engineer is familiar with neural networks. Use of Django suggests that the engineer is familiar with web applications.

Figure 6:
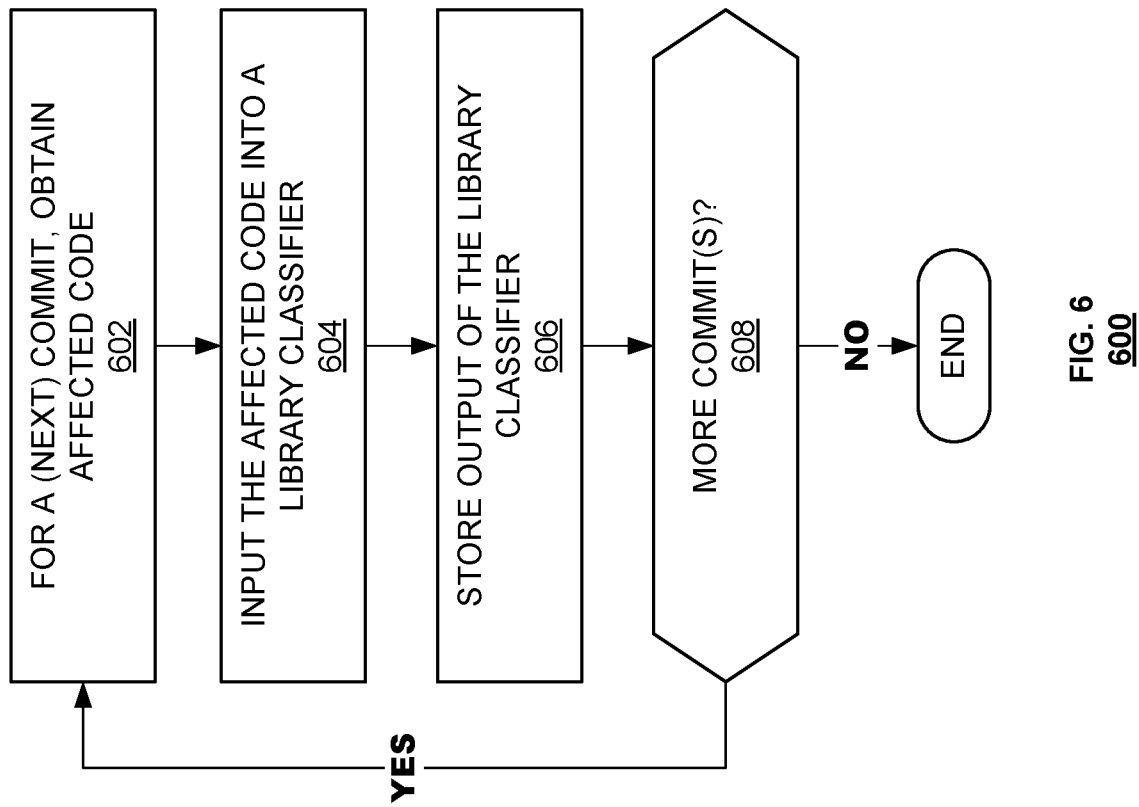
FIG. 6 is a flow chart illustrating an embodiment of a process for extracting a code feature by analyzing a signal from a version control system.
Figure 5:
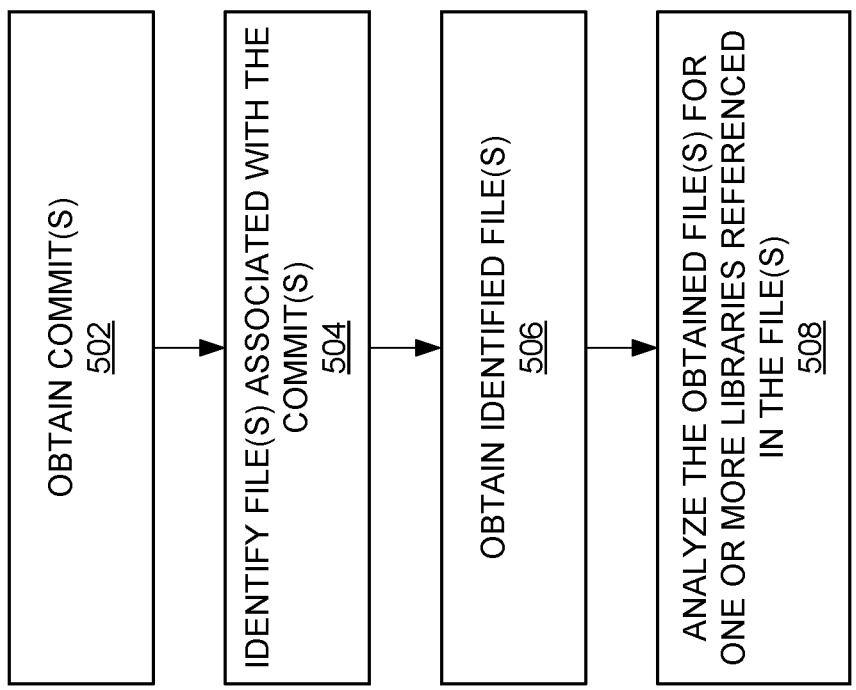
FIG. 5 is a flow chart illustrating an embodiment of a process for extracting a code feature by analyzing a signal from a version control system.

In various embodiments, when the system parses source code of a commit, the system notes third party library imports and third party library use such as object creation or function invocation. The system may maintain an index of (well-known) libraries with each class, function, and/or method in it tagged with a technology tag such as "machine learning" or "networking." When the system detects that a particular function of a 3rd party library is called, the system attributes points of experience in the corresponding technology to the commit author. For example, if an engineer calls calcOpticalFlowPyrLK( ) function from OpenCV library, the engineer is credited with knowledge of "computer vision" and "optical flow" technologies. An example process for library determination is shown in FIGS. 5 and 6.

In various embodiments, a system maintains one or more statistical models of source code from various public repositories (sometimes called "open source attribution"). For example, relatively high quality public repositories may be selected for analysis. Various statistical models can be used, for example rNN (recurrent neural networks). When processing a commit by a signal extraction program, the system determines a similarity of a commit to code found in a public repository, and, if such similarity is found, the system credits the commit's author with experience in technology associated with that repository (e.g., the prevailing technology in the repository). For example, if a commit looks like a commit from a Blender open source project, the engineer is credited with experience in "3D graphics."

Code longevity may be measured by a statistical distribution of lifetime for lines the engineer changed in their commits. Long-lived code may indicate that an author is more proficient or experienced. Code longevity may be measured by tracking a time of creation of a section of code, when that section of code is overwritten, and who overwrote that section of code. In some embodiments, a user's code longevity may be evaluated against a team's code longevity. For example, FIG. 8D shows an example graphical representation of code longevity. An individual contributor's code longevity may be compared with that of a project team to show the contributor's performance relative to the rest of the team.

Team interaction includes team dynamics and modification by one user of code authored by another user. For example, team interaction may be indicated by information about engineer's coworkers who tend to edit the same code that the engineer does. As another example, team interaction may be indicated by code re-use information such as observations that coworkers often import the engineer's modules. When others tend to edit a particular user's code, that user may be considered less competent than the average contributor. When the user tends to edit his or her own code, that user may be considered of average competency. When the user tends to edit other contributors' code, that user may be considered of above average competency.

In various embodiments, the system may be configured to provide feedback regarding the quality of a user's contribution. For example, the system classifies each commit as a "quality commit" or "not quality commit." In one aspect, an intuition behind judging the quality of a commit is that many commits are not very interesting. Many commits may indicate routine changes in variable names, minor text changes, or whitespace changes. For each commit, the system may run its code through a quality commit detector, and save the result along with other signals.

Various techniques can be used to determine if a commit is a quality commit. For example, a neural network based detector that is trained on publicly available code review information may be used to detect quality of a commit. For example, if a code review involved a discussion before being accepted, it is probably an interesting commit. A commit may be tagged with this information, e.g., whether a commit was discussed before acceptance. If the code was accepted right away, it is probably a not very interesting commit. As another example, a neural network based detector may be configured to determine if a commit likely belongs to a high quality repository (a high quality repository being defined as, for instance, a Git repository with many stars or forks). In various embodiments, a commit that looks like it could belong to a high quality repository is considered a quality commit.

In various embodiments, a system establishes credibility of signals extracted from repositories by using a system of credibility. For example, a repository is assigned a credibility score that depends on the credibility scores of engineers who are contributors to this repository. More credible contributing engineers make the repository more likely credible and the repository is scored accordingly. An engineer's credibility score may be determined by at least one of: scores of repositories they contribute to, comparing various statistics of commit activity of an engineer (such as frequency of commits, number of lines changed, languages and technologies used, etc.) to a statistical model computed from all engineer profiles, and the like.

In various embodiments, an author may be determined to be a pioneer of thought if she introduces new thinking into a project or organization. For example, the author may be the first person to use a technique such as a calling a specific library, using C++ lambas, or writing a module. If other contributors to the project later begin to adopt these new techniques, the first author who introduced such techniques may be credited with introducing these practices to her collaborators.

Miscellaneous metrics (sometimes called "fun facts") may be determined (in some cases, heuristically) from signals and included in a user profile. The fun facts allow a user to highlight interesting facts about himself or herself such as syntax preferences and work habits. In some embodiments, a user may select a subset of fun facts to include in the user profile. For example, if the user is targeting a particular industry or company, the user may select the most relevant fun facts to be displayed in his or her profile. Miscellaneous metrics include, without limitation:

I mostly use Spaces overs Tabs for indentation
I primarily program in Python
Underscores are my most used file naming convention
I contribute to open source projects
I participate in code reviews
I frequently work with a team of [team size]
I use semicolons in my JavaScript
I typically use inline braces
I generally use multi line if statements in my code
I often avoid using global variables
I usually run Pylint over my code
My average line of code is 80 characters
I typically indent my code blocks with 4 spaces
I add module, function, method and in-line comments regularly
I use blank lines to separate out my blocks of code
I like CamelCase
I do Functional programming
I make a lot of commits with small changes
I refactor my own code
I refactor other people's code
My HTML is w3c valid
I do a lot of CSS2 (or CSS3) etc.
I use a lot of Google®/Facebook®/Twitter® open source libs or tech
I delete a lot of code
I commit my code at night
I commit directly to master
I commit to master through pull requests
I fork code
I like list comprehensions (Python)
I write recursive code
I use [tool X] to autogenerate documentation for me
I write documentation
My average file is 200 lines long
My Python code follows PEP 8
I use the Prettier code formatter
I use ESlint over my JavaScript
My average function has 20 lines of code
My deepest nested loop is 5
I've used [libraries] in Python
Percentage of duplicate code (e.g., detect copy & paste)
My preferred build system is CMake
My methods are [#] lines long on average
I use, on average, [#] levels of indentation
I write, on average, [#] functions per file
On average I have [#] lines of code in a file
I like to enforce const for parameters passed by value
I use template metaprogramming
I use inline assembly in my code
The longest name of my classes is [#] characters long
I sometimes use multiple inheritance
The most used library besides STL is Boost
I profile my code with gprof
I frequently write unit tests
On average my commits are [#] lines long
My most productive days are [day of week]
My constructors are explicit when possible
I use pragma once in my header files
I use asserts in my code
I like to optimize my code (may be extracted from the commit message)
On average I have [#] commits per file
I use ZeroMQ for RPC
I like to use Protobuf for serialization library
I have [#] lines of comments per 100 lines of code
The oldest file in my repository that I edited recently is 2 years old
[#] files account for 80% of my commits in the past 3 months
I have autogenerated code in my repository
The longest file in the repository is over [#] lines long
In one day I have been able to remove [#] lines of code
I like to write multithreaded programs
My code to empty line ratio is X
I follow up on TODOs
My TODOs live on average X days
My weirdest class name is [MostAwesomeManager]
I use ES2015 JS standards in my JavaScript
My most commonly used ES2015 feature is [name of function]
I order my CSS statements [alphabetically/inside out/outside in]
I prefer to keep my CSS separate from my JavaScript
I use [CSS modules, glamour, etc.] for inline styles
I use [Airbnb®/Google®/etc.] coding style in my JavaScript
I use [BEM/SUITCss/SMACSS/etc.] coding style in my CSS
I make libraries, not programs
I write comments before code
I emacs/vi everything
I use grep, awk, sed, and emacs instead of IDEs
I pre-cache the code base before I start writing code
ASCII art is the best way to decorate code
I gprof and memsan everything Returning to FIG. 3, one or more signals are obfuscated (308). In various embodiments, a signal is encrypted or otherwise processed to disassociate the signal from a specific commit. In some embodiments, the signal is obfuscated by hashing a hash of a commit ID and the relevant lines of code associated with the commit. Output of the hashing (e.g., hash{hash (commitID), relevant lines}) is a signal that cannot be reverse engineered to determine contents of the commit and thus disassociates the signal from a specific underlying commit. The relevant lines of code may be those lines associated with the commit library. In some embodiments, a record of those commit IDs that have been processed may be tracked so as to avoid duplicate work and/or to ensure that commit IDs have been processed and not unintentionally missed. For example, hash {hash (commitID)} indicates that the "commitID" has been processed without sending the contents of the commitID. In one aspect, this ensures that a signal is not redundantly sent from the client device to the remote server. In another aspect, sensitive signals are obscured before being sent while also being tracked.

The one or more obfuscated signal is output (310). An obfuscated signal may include an obfuscation of a commit ID and an obfuscation of relevant lines of code. This may allow commit IDs to be tracked and noted that they have been processed. The signal(s) may be output in a variety of ways. For example, the signal may be output to storage, transmitted, and the like. In one aspect, the signal may be transmitted to a remote server without causing any sensitive information to be lost over a potentially unsafe transmission link or unknown recipient because the signal is obfuscated.

The process determines whether to stop (312). The process may stop in response to criteria such as a passage of time or event having occurred. For example, the signal extraction may be performed during scheduled maintenance and when the scheduled time ends, a stop condition has been met and the process terminates. As another example, the process may stop in response to a determination that commits have been processed (e.g., no unprocessed commits remains).

In various embodiments, process 300 may be implemented by an open source program. This may help to establish trust with engineers who may be requesting user profile generation on proprietary repositories. This may facilitate distribution of a signal extraction program over open source distribution channels such as Homebrew® on Mac OS® or APT on Debian Linux®.

FIG. 4 is a flow chart illustrating an embodiment of a process for generating a user profile from source code. In one aspect, process 400 generates a user profile from signals associated without source code without needing to directly read the source code. This may improve security because proprietary code need not be transmitted to derive information for a user profile. Process 400 may be implemented on a device such as server 150 shown in FIG. 1 or computer system 1000 shown in FIG. 10.

The process begins by determining whether a signal has been received (402). In various embodiments, a signal may be received from a remote client such as from a signal extraction engine further described with respect to FIG. 1. If a signal has not been received, the process returns to the beginning of the process. For example, the process may continue monitoring to determine whether signals have been received. If a signal has been received, the process proceeds to 404.

The process aggregates the signal with one or more other signals (404). In some embodiments, signal aggregation includes collecting signals over time for a specific user. The aggregated signals may reflect the user's development as an engineer. In some embodiments, signal aggregation includes comparing signals to one another. Signals obtained from multiple contributors to a project may be compared to confirm or correct information derived from the signals. In various embodiments, at least part of the analysis described with respect to signal extraction (306 of FIG. 3) may be performed as part of the signal aggregation. In one aspect, a server supporting process 400 might be more powerful than a local client and thus may expedite processing of the signals.

In various embodiments, the signal aggregation includes determining user profile sections and output for various sections from signals. Referring to the example profile shown in FIG. 8B, signals relevant to C++ may be aggregated to output the commits, qommits, and lines of code shown in the top left panel associated with C++. Similarly, signals relevant to the other programming languages (Python, Ruby, JavaScript) may be aggregated (e.g., tallied) to output those sections shown in graphical user interface 810.

Returning to FIG. 4, the process generates a user profile based on the aggregated signals (406). The user profile may include facts, features, metrics, and other information about a user's work habit and expertise. For example, the user profile may include statistical information about code contributions, areas of technological expertise, and the like, as further described herein. The user profile may include one or more sections presenting various aspects of a user's work habit and expertise. The sections may be arranged based one or more pre-defined choices (by a user or in accordance with an employer or target).

The process renders the user profile on a graphical display (408). The user profile may be output in text and/or graphical form on a user interface. In some embodiments, the user profile may be part of a social network, in which users and employers may browse profiles to find user profiles that meet a hiring description. The profile may be assembled in sections. In various embodiments, one or more sections may be displayed according to permissions. For example, sections may be indicated to be visible to the public, visible within an organization, visible to connections, etc. In some embodiments, the user profile is dynamically updated or rendered as more information is received about the user. In some embodiments, the user profile is periodically updated, for example, every few hours or days in response to more signals having been obtained about the user. In some embodiments, the user profile may include sections that are visible based on permission. For example, some sections may only be visible to other users within an organization. The user may, in some embodiments, select which sections are visible to whom. In some embodiments, permissions may be defined by a project owner, organization, etc. An example of a user profile is shown in FIGS. 8A-8H and FIGS. 9A-9D.

The process determines whether to stop (410). The process may stop when one or more criterion has been met. For example, a user profile may have an associated limited number of times the profile may be updated. When that limit has been met, the user profile is not updated for a threshold length of time. In some embodiments, the generation of a user profile may stop in response to user request. For example, a user may indicate that she no longer wishes certain code repositories to be considered for her profile. In response, the process may stop obtaining signals corresponding to those indicated code repositories such that they will not be reflected by her user profile.

FIG. 5 is a flow chart illustrating an embodiment of a process for extracting a code feature by analyzing a signal from a version control system. Process 500 may be performed as part of another process. For example, process 500 may be performed to extract a signal from a set of commits (306) of FIG. 3. Process 500 may be implemented on a device such as client 110 shown in FIG. 1 or computer system 1000 shown in FIG. 10.

The process obtains one or more commits (502). The commit(s) may be obtained in response to a user checking in code or as part of routine maintenance, as further described herein with respect to 304 of FIG. 3. In various embodiments, a commit includes information about contents of modified source code (e.g., lines that were modified), files or a code repository in which the modification was made, author, timestamp, and other metadata associated with the commit.

The process identifies one or more files associated with the commit(s) (504). The file(s) associated with the commit refer to documents including the source code that was modified and associated with the commit. While a commit may include only a snippet of code, the identification of the file allows contextual information to be obtained about the snippet of code associated with the commit. The file(s) may be part of a larger project code repository. The file(s) may be identified based on metadata associated with the commit.

The process obtains the identified file(s) (506). The process may obtain the file, in various embodiments, by requesting the file from a source code repository. The source code repository may be local to a device executing the process such as for distributed version control systems. In some embodiments, the file may be requested from a remote server.

The process analyzes the obtained file(s) for one or more libraries referenced in the file(s) (508). In various embodiments, the process parses the obtained files to identify one or more libraries called by, imported, used, or otherwise referenced by source code in the file. For example, the process may check the file with regular expressions to identify libraries that are called by the source code. A list of commonly used libraries may be maintained and used to match regular expressions to determine whether a library has been called. As another example, the process may obtain an expression from an abstract syntax tree (AST) associated with the source code included in the file to determine libraries that have been called. This approach of using the AST may help with identification of less common libraries or to identify calls that are made in less conventional ways.

In some embodiments, libraries referenced anywhere in a source code file is identified, which may not necessarily be libraries that are referenced by the snippet of code associated with the commit that triggered the retrieval and analysis of the corresponding source code. This allows analysis of an entire code file or context for a commit.

FIG. 6 is a flow chart illustrating an embodiment of a process for extracting a code feature by analyzing a signal from a version control system. Process 600 may be performed as part of another process. For example, process 600 may be performed after process 500 of FIG. 5 to extract a signal from a set of commits (306) of FIG. 3. Process 600 may be implemented on a device such as client 110 shown in FIG. 1 or computer system 1000 shown in FIG. 10.

The process obtains affected code for a commit (602). Code may be obtained for a current commit. The affected code associated with the commit may include code associated with changes noted by the commit. For example, if a commit notes a line of code has been replaced, the affected code retrieved include the deleted line of code and the added line of code. An example of affected code is line 101 shown in FIG. 7.

Returning to FIG. 6, the process inputs the affected code into a library classifier (604). The library classifier may be a machine learning model that takes code as input and outputs libraries referenced by the input code. The library classifier may be trained according to machine learning techniques to improve is ability to identify libraries referenced in code that is provided as input to the model. In some embodiments, the library classifier may be trained to identify technologies associated with libraries have been called. For example, the library classifier may take code as input, and output experience with technologies as demonstrated by libraries called in the code.

As more fully described herein, the libraries used in a commit (sometimes called "library attribution") may indicate familiarity with various technologies. For example, use of OpenCV is associated with computer vision, TensorFlow is associated with neural networks, and Django is associated with web applications.

The process stores output of the library classifier (606). The output of the library classifier may be stored locally in some embodiments or transmitted to a remote storage location in some embodiments. For example, the output may be stored and later obfuscated prior to transmission to a remote server. In some embodiments, the output may be stored and presented to a human reviewer to confirm or improve the classification made by the library classifier.

The process determines whether there are additional commits (608). If there are additional commits, e.g., to be processed with a set of commits, the process proceeds to 602 in which affected code for a next commit is obtained.

FIG. 7 illustrates an example of a commit obtained in some embodiments. FIG. 7 shows a conceptual example of a commit. The graphical user interface displays commits made on a particular day (here, Oct. 4, 2017) for a specific project (grocerybill.py). In particular, commit section 710 shows that two commits were made: Alice updated the price of orange and Bob added a tax call. Code section 720 shows the portion of code affected by one or more of the commits listed in commit section 710. Here, Alice's commit is represented by the highlighted segments 702 and 704. Line 101 has been modified. When Alice committed the modification of line 101, segment 702 is replaced with segment 704. As shown, the price of orange is changed from 40 cents to 80 cents. Thus, the commit in which Alice updated the price of orange corresponds to the highlighted sections (702, 704) of code shown in code section 720. Various signals may be obtained from the commit as further described herein. For example, this commit corresponds to a relatively simple change to the code involving few lines. However, information about Alice can be gleaned from the code, for example, Alice has experience with Python. Alice's profile may be updated accordingly.

Figure 8A:
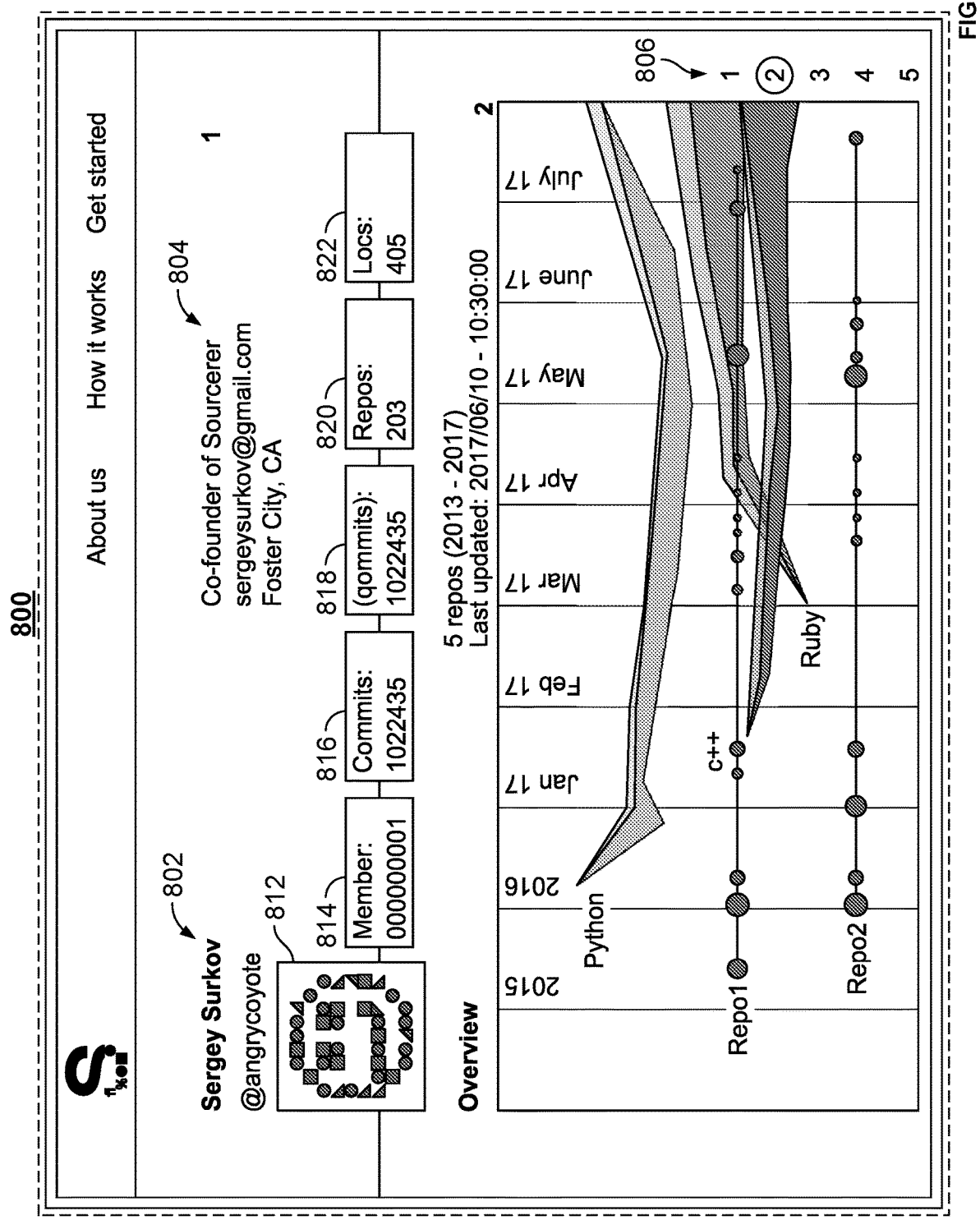
FIG. 8A shows an example user profile rendered on a graphical user interface.

FIG. 8A shows an example user profile rendered on a graphical user interface. The user profile may be assembled according to the techniques described herein such as the process shown in FIG. 4. GUI 800 may include one or more sections, which may be useful by an assessor to determine a user's ability.

In various embodiments, a user profile combines information gathered from source code authored by an engineer and information manually provided by the engineer. For example, the engineer could provide information about their location, their employment history, and the like. An engineer can also rearrange and change presentation of the information extracted from source code. For example, if the engineer has not used certain technology for a long time and does not want the certain technology to define them professionally, the engineer can delete this technology from the engineer's profile. Alternatively, an engineer can rearrange technology presented on the profile in a way that makes a better representation of their skills, such as putting the technology they like the most first. In some embodiments, a user (e.g., engineer) is prevented from saving edits to the automatically generated profile that contradict the analysis that was automatically performed on the user's source code that was stored at one or more repositories. For example, a user may not be able to add to his or her profile a programming language to a list of programming languages that he or she knows if source code associated with such a language has not been detected in the one or more analyzed repositories for the user.

In this example, a first section shown in FIG. 8A provides biographical and high-level statistics about a user. This may be analogous to a header for a resume, and may include information to pique a reader's interest. Here, a username 802 (Sergey Surkov) is displayed with accompanying handle (@angrycoyote). Titles, contact information, and the like may also be displayed as shown in section 804. In some embodiments, a profile picture 812 may be displayed. Various metrics associated with the user may be displayed. Here, the metrics include member number 814, commits 816, qommits 818, repos 820, locs 822.

The member number 814 may indicate how long the user has been using the profile generation system. A user who has been a member for a longer period of time might be expected to have more data points and a more accurate profile. It is also possible that a user who has been a member for a longer time may have a less accurate profile because the user's skills from a long time ago (such as when he or she was a new-grad) may be included in the profile.

The commits 816 may indicate how many commits the user has made across one or more repositories. This may be a measure of how prolific the user is, and may indicate how experienced or active the user is.

The number of qommits 817 may indicate how many commits meeting a threshold quality the user has made across one or more repositories. Here, a "qommit" refers to a commit that meets a quality threshold. A qommit may be determined based on a variety of factors as more fully described herein.

The repo number 820 indicates how many repositories a user contributes to. A larger number of repos may indicate that the user is active in many different projects or different areas, while a lower number of repos may indicate that the user is focused on a smaller number of projects. In one aspect, a larger repo number may indicate breadth of knowledge, while a smaller number may indicate depth of knowledge.

The loc 822 indicates the lines of code that a user has authored or modified. A larger number of lines of code may indicate that the user is more experienced, more prolific, and/or more wordy.

In various embodiments, an overview chart may be displayed for the user. The overview may show languages for which the user has experience and a level of contribution to projects associated with those languages. The thickness or area of a shaded region in the chart corresponds to a number of commits, where more commits correspond to a larger area and fewer commits correspond to a smaller area. The more translucent section shows a user's commits, while a more opaque section shows a team's contribution. This may show a user's relative contribution compared to a team's. The overview chart can provide a sense of a user's skills and contributions at a glance.

In some embodiments, the graphical user interface includes navigational menu 806. Selection of a corresponding number jumps to that section to allow someone viewing the profile to quickly access a desired section of the profile. In some embodiments, the sections are sequential and scrolling causes subsequent sections to be loaded as they are brought into view of a graphical user interface window.

Figure 8B:
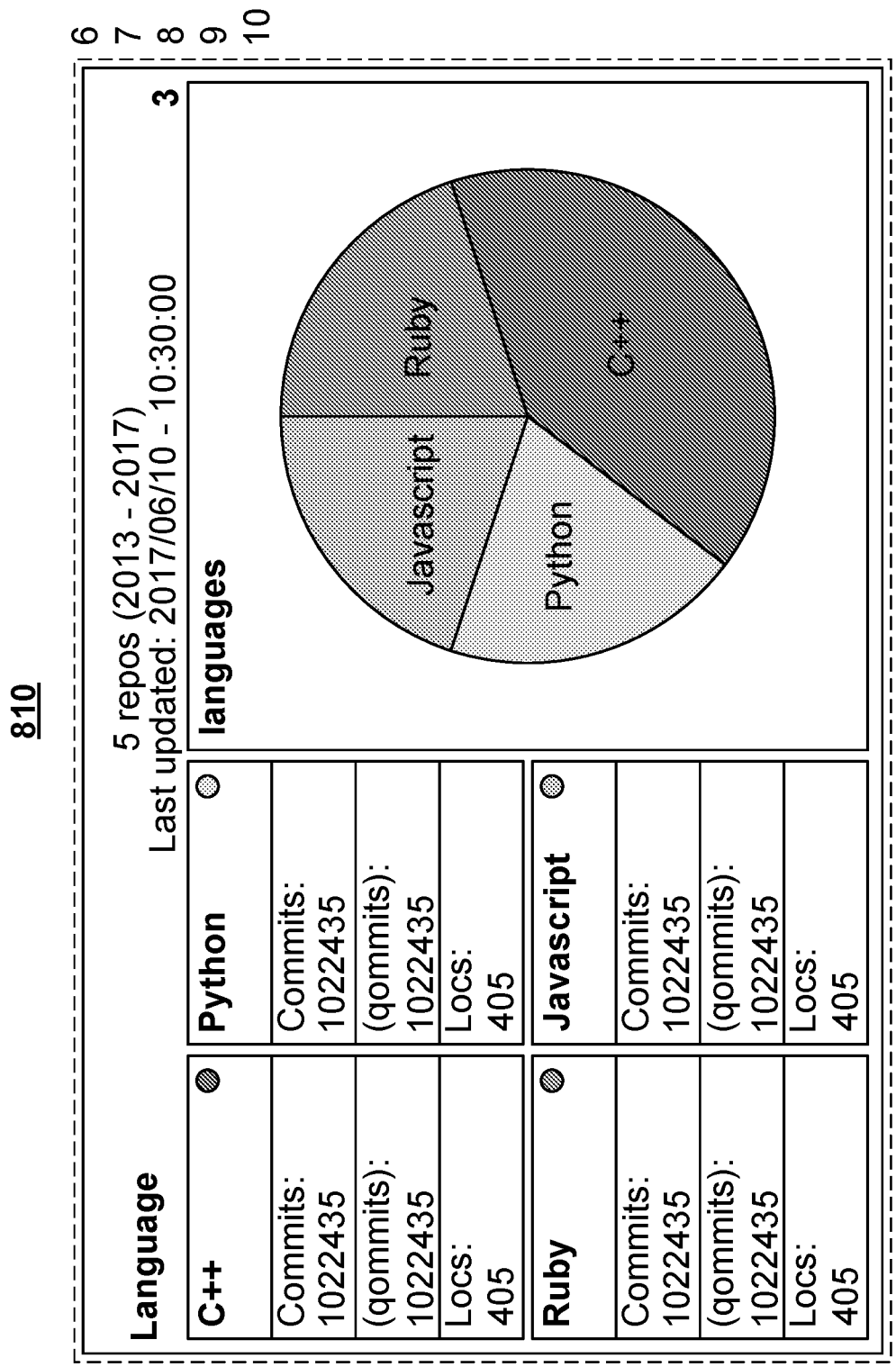
FIG. 8B shows an example user profile rendered on a graphical user interface.
Figure 8D:
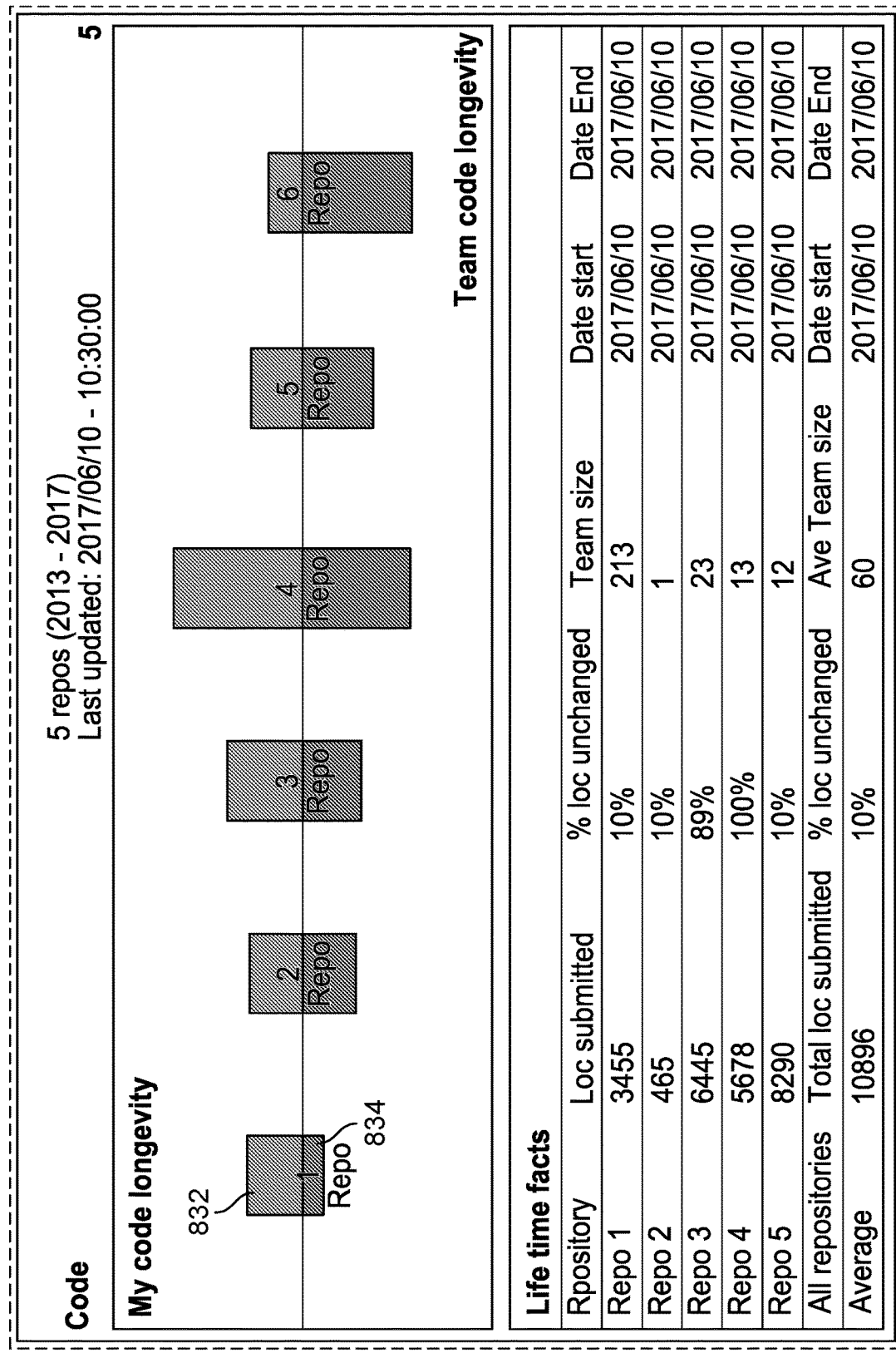
FIG. 8D shows an example user profile rendered on a graphical user interface.

FIG. 8B shows an example user profile rendered on a graphical user interface. In this example, a user's experience with languages is represented by a pie chart and more specific statistics (e.g., commit, qommit, lines of code "loc").

FIG. 8C shows an example user profile rendered on a graphical user interface. In this example, a user's experience with technological areas is represented by libraries accessed corresponding to various technologies. For example, this user has reference the TensorFL, Dlib, and MLPACK libraries, which indicate familiarity with machine learning.

FIG. 8D shows an example user profile rendered on a graphical user interface. Here, the user's code longevity 832 is shown relative to the team's code longevity 834. For the first repository, the user's code longevity is better than the team's code longevity, meaning that the user's code tends to survive longer than those of his other team members. In this example, life time facts are also shown. The life time facts may include explanations for the code longevity bar graph. For example, for each repository, the lines of code submitted, percentage of lines of code that remain unchanged, team size, and project start and end dates are displayed.

Figure 8E:
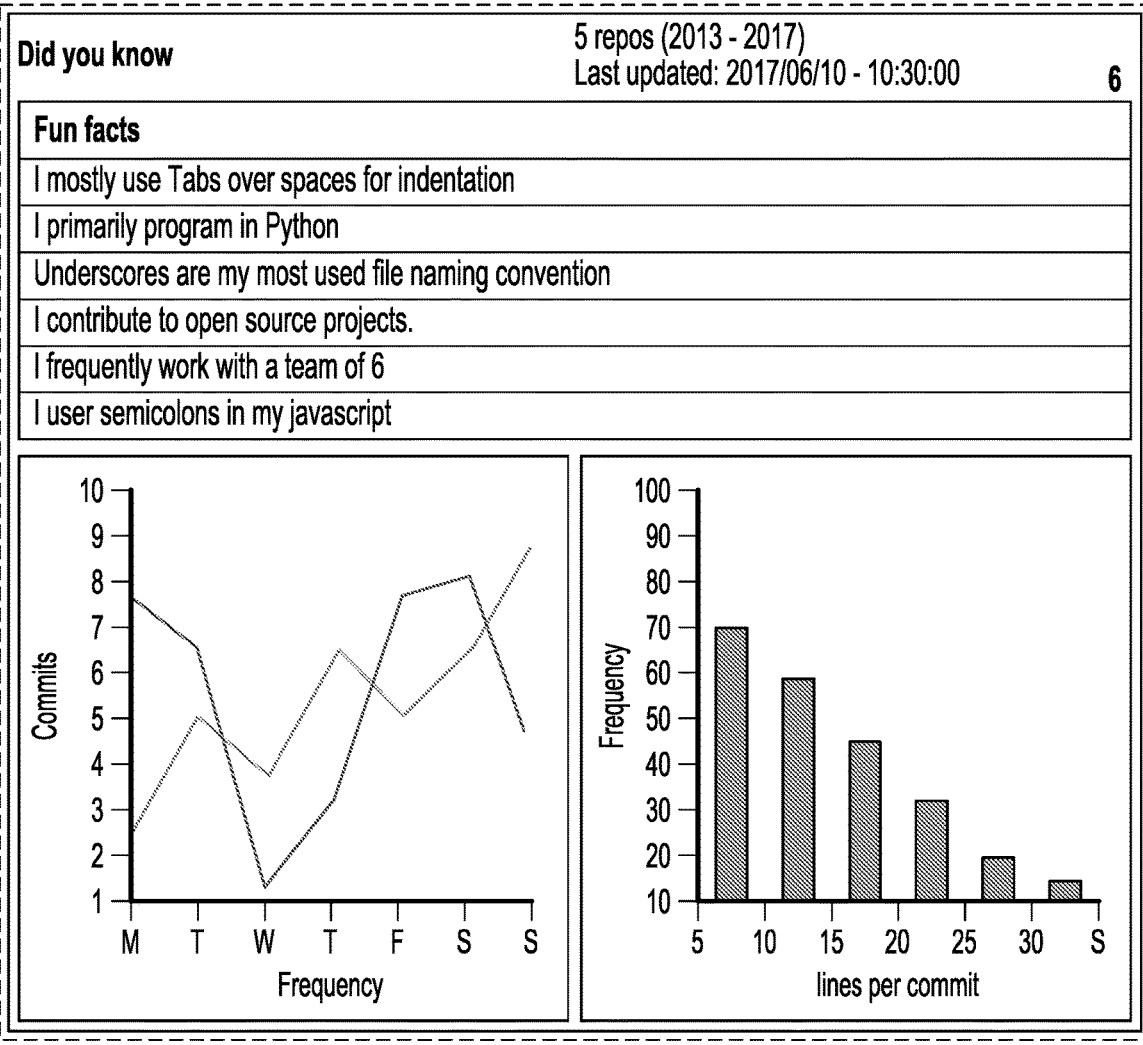
FIG. 8E shows an example user profile rendered on a graphical user interface.

FIG. 8E shows an example user profile rendered on a graphical user interface. In this example, several fun facts are displayed. Example fun facts are further described herein with respect to miscellaneous metrics. A user may select the number of fun facts to display or which fun facts to display. For example, this user has selected six fun facts relevant to his job search to be displayed. In various embodiments, one or more charts or graphs may be displayed with the fun facts. For example, this may make the fun facts more intelligence or may group several fun facts.

Figure 8F:
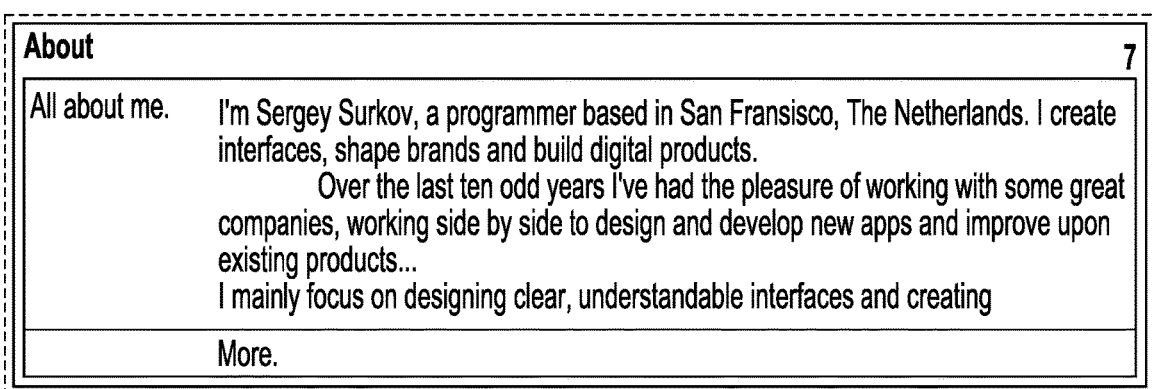
FIG. 8F shows an example user profile rendered on a graphical user interface.

FIG. 8F shows an example user profile rendered on a graphical user interface. The about section in this example may be modified by the user. In some embodiments, the about section may be automatically generated based on analysis of contributions to source code and/or other information provided by a user.

FIG. 8G shows an example user profile rendered on a graphical user interface. The work experience section in this example may be automatically generated based on information provided by a user, found from other resources, or modifications made by the user. The work experience section may be analogous to a resume. In some embodiments, the work experience section may be automatically formatted to be in a user friendly format.

FIG. 8H shows an example user profile rendered on a graphical user interface. In this example, connections and career path may be displayed. For example, the user profile may be part of a social media network. User's may connect with other users. Connections may be displayed in the user profile. In some embodiments, career path advice or guidance may be shown in the user profile. For example, a user may consult the career path section to determine what experiences to gain (e.g., contribute more to projects in a particular coding language) to reach a career goal.

Figures 9A, 9B:
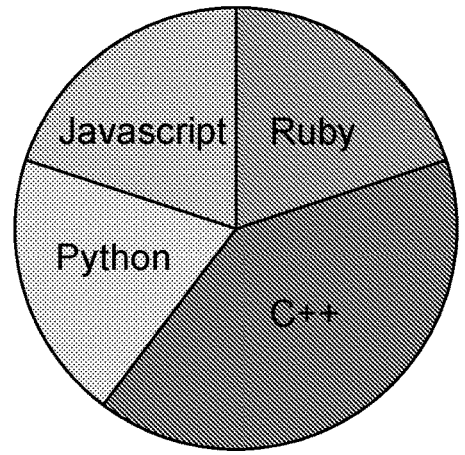
FIG. 9A shows an example user profile rendered on a graphical user interface.
FIG. 9B shows an example user profile rendered on a graphical user interface.
Figures 9C, 9D:
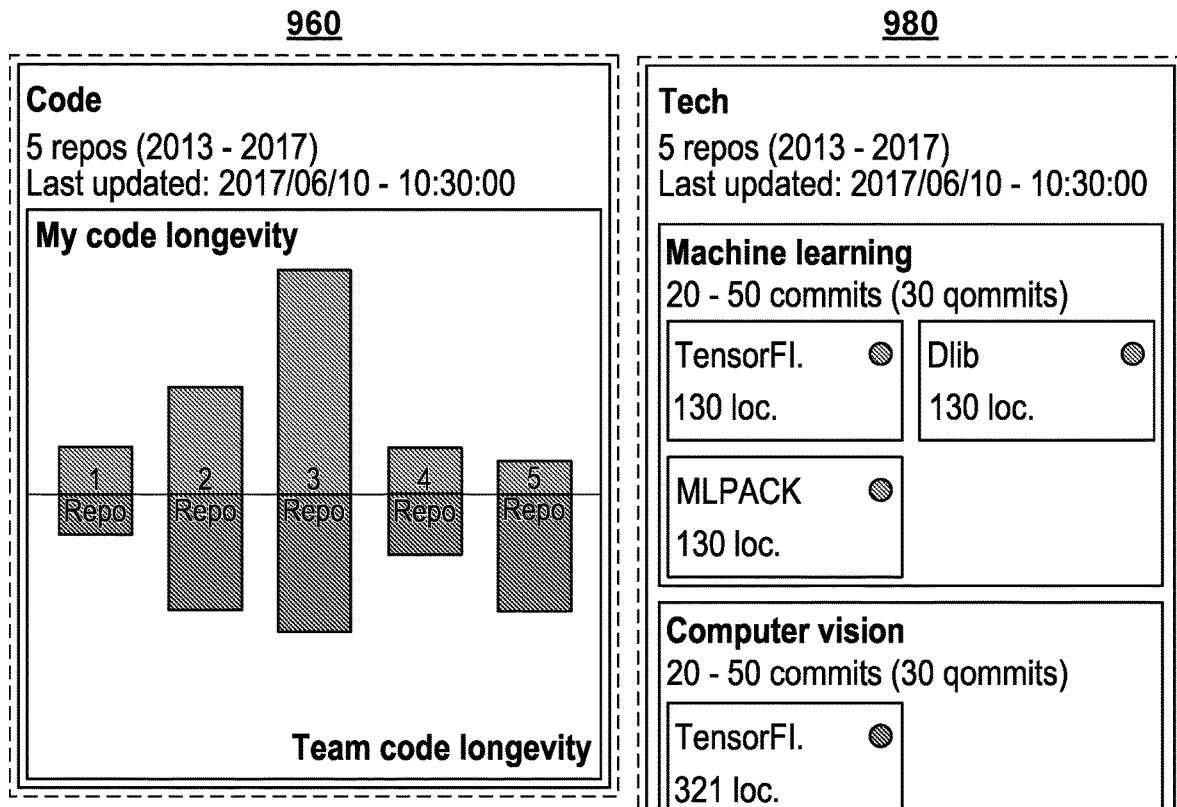
FIG. 9C shows an example user profile rendered on a graphical user interface.
FIG. 9D shows an example user profile rendered on a graphical user interface.

FIG. 9A shows an example user profile rendered on a graphical user interface. FIG. 9A corresponds to FIG. 8A. FIG. 9B shows an example user profile rendered on a graphical user interface. FIG. 9B corresponds to FIG. 8B. FIG. 9C shows an example user profile rendered on a graphical user interface. FIG. 9C corresponds to FIG. 8D. FIG. 9D shows an example user profile rendered on a graphical user interface. FIG. 9A corresponds to FIG. 8C. In some embodiments, GUI 900 is used by an assessor to determine a user's ability. GUI 900 may be suitable for devices with limited screen size such as a mobile phone. Each of the GUIs shown in FIGS. 9A-9D correspond to the larger version shown in FIGS. 8A-8H unless otherwise described herein.

Figure 10:
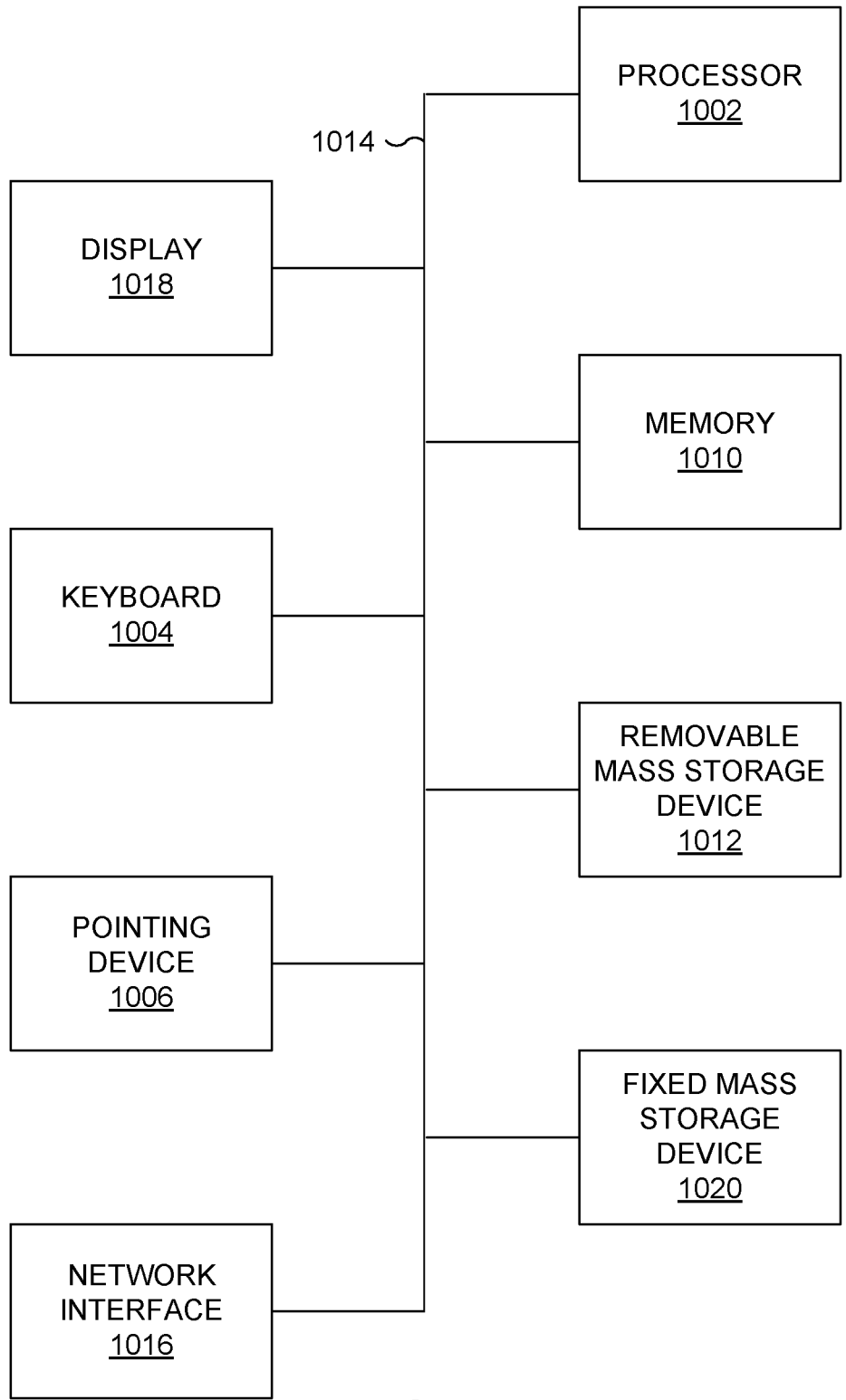
FIG. 10 is a functional diagram illustrating a programmed computer system for generating a user profile from source code in accordance with some embodiments.

FIG. 10 is a functional diagram illustrating a programmed computer system for generating a user profile from source code in accordance with some embodiments. As will be apparent, other computer system architectures and configurations can be used to perform the described user profile generation technique. Computer system 1000, which includes various subsystems as described below, includes at least one microprocessor subsystem (also referred to as a processor or a central processing unit (CPU) 1002). For example, processor 1002 can be implemented by a single-chip processor or by multiple processors. In some embodiments, processor 1002 is a general purpose digital processor that controls the operation of the computer system 1000. In some embodiments, processor 1002 also includes one or more coprocessors or special purpose processors (e.g., a graphics processor, a network processor, etc.). Using instructions retrieved from memory 1010, processor 1002 controls the reception and manipulation of input data received on an input device (e.g., image processing device 1006, I/O device interface 1004), and the output and display of data on output devices (e.g., display 1018).

Processor 1002 is coupled bi-directionally with memory 1010, which can include, for example, one or more random access memories (RAM) and/or one or more read-only memories (ROM). As is well known in the art, memory 1010 can be used as a general storage area, a temporary (e.g., scratch pad) memory, and/or a cache memory. Memory 1010 can also be used to store input data and processed data, as well as to store programming instructions and data, in the form of data objects and text objects, in addition to other data and instructions for processes operating on processor 1002. Also as is well known in the art, memory 1010 typically includes basic operating instructions, program code, data, and objects used by the processor 1002 to perform its functions (e.g., programmed instructions). For example, memory 1010 can include any suitable computer readable storage media described below, depending on whether, for example, data access needs to be bi-directional or uni-directional. For example, processor 1002 can also directly and very rapidly retrieve and store frequently needed data in a cache memory included in memory 1010.

A removable mass storage device 1012 provides additional data storage capacity for the computer system 1000, and is optionally coupled either bi-directionally (read/write) or uni-directionally (read only) to processor 1002. A fixed mass storage 1020 can also, for example, provide additional data storage capacity. For example, storage devices 1012 and/or 1020 can include computer readable media such as magnetic tape, flash memory, PC-CARDS, portable mass storage devices such as hard drives (e.g., magnetic, optical, or solid state drives), holographic storage devices, and other storage devices. Mass storages 1012 and/or 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can be used to provide access to other subsystems and devices as well. As shown, these can include a display 1018, a network interface 1016, an input/output (I/O) device interface 1004, an image processing device 1006, as well as other subsystems and devices. For example, image processing device 1006 can include a camera, a scanner, etc.; I/O device interface 1004 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1000. Multiple I/O device interfaces can be used in conjunction with computer system 1000. The I/O device interface can include general and customized interfaces that allow the processor 1002 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1016 allows processor 1002 to be coupled to another computer, computer network, or telecommunications network using a network connection as shown. For example, through the network interface 1016, the processor 1002 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 10 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1004 and display 1018 share the touch sensitive screen component, which both detects user inputs and displays outputs to the user). In addition, bus 1014 is illustrative of any interconnection scheme serving to link the subsystems. Other computer architectures having different configurations of subsystems can also be utilized.

The techniques described herein find application in variety of engineering settings including profile generation for software engineers, firmware engineers, and the like. A system for automatic generation of user profiles from source code is described herein. The system may be implemented by one or more processors (sometimes called a "farm"). Although described chiefly using the example of a system, user profile generation techniques described herein may be implemented according to a process, which may be embodied in a non-transitory computer-readable medium. Many examples described the techniques with respect to an engineer's profile. The techniques also find application for other types of users including non-engineers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
obtaining, by a processor, a set of commits associated with a user from a source code version control system;
extracting, by the processor, at least one signal from the set of commits;
determining the user's degree of experience in a technological field based at least in part on an assigned number of points of experience in the technological field, wherein the determining of the degree of experience comprises:
    determining whether a library associated with a commit in the set of commits is related to the technological field, wherein the technological field comprises one or more of the following: computer vision, neural networks, and/or web applications, wherein the commit is input into a library classifier, which outputs the technological field, and wherein the library classifier is trained using a machine learning technique; and
    in response to a determination that the library associated with the commit is related to the technological field, determining that the user has experience in the technological field;
obfuscating, by the processor, the at least one signal to disassociate the at least one signal from the commit in the set of commits;
determining, by the processor, that the commit has not been previously processed based at least in part on a commit identifier (ID) associated with the commit;
in response to the determination that the commit has not been previously processed, outputting, by the processor, the at least one obfuscated signal; and
rendering, by the processor, a user profile for the user on a graphical user interface, wherein the user profile includes a chart showing at least one language and an associated experience and level of contribution to at least one project in the at least one language based at least in part on the user's degree of experience, wherein the level of contribution of the user is represented by a size of a shaded region in the chart and the level of contribution of the user relative to other contributors is represented by a degree of opaqueness in the shaded region.

2. The method of claim 1, wherein the obfuscation of the at least one signal includes hashing the commit identifier (ID) of the commit associated with the at least one signal.

3. The method of claim 1, wherein the obfuscation of the at least one signal includes encrypting the at least one signal.

4. The method of claim 1, wherein the extracted at least one signal includes a feature of the set of commits.

5. The method of claim 1, further comprising determining, by the processor, an ability based at least in part on a library referenced by the at least one signal.

6. The method of claim 1, further comprising training, by the processor, a library classifier to identify knowledge of a technology area based at least in part on a library referenced by the at least one signal.

7. The method of claim 1, further comprising determining, by the processor and based at least in part on the extracted at least one signal, experience with a programming language.

8. The method of claim 7, further comprising outputting the user's degree of experience with a programming language in a user profile.

9. The method of claim 1, wherein the determining of the degree of experience further comprises:
determining whether a particular function of a third party library associated with the commit is called, wherein the third party library is related to a corresponding technology; and
in response to a determination that the particular function of the third party library associated with the commit is called, determining that a user has experience in the corresponding technology.

10. The method of claim 1, wherein the determining of the degree of experience further comprises:
determining whether code associated with the commit is similar to code from a public repository, wherein the code from the public repository is related to one or more of the following technologies: recurrent neural networks and/or 3D graphics; and
in response to a determination that the code associated with the commit is similar to the code from the public repository, determining that a user has experience in the one or more of the following technologies.

11. A system comprising:
a communications interface configured to
    obtain a set of commits associated with a user from a source code version control system; and
    extract at least one signal from the set of commits; and
a processor configured to:
    determine the user's degree of experience in a technological field based at least in part on an assigned number of points of experience in the technological field, wherein the determining of the degree of experience comprises to:
        determine whether a library associated with a commit in the set of commits is related to the technological field, wherein the technological field comprises one or more of the following: computer vision, neural networks, and/or web applications, wherein the commit is input into a library classifier, which outputs the technological field, and wherein the library classifier is trained using a machine learning technique; and
        in response to a determination that the library associated with the commit is related to the technological field, determine that the user has experience in the technological field;
    obfuscate the at least one signal to disassociate the at least one signal from the commit in the set of commits;
    determine that the commit has not been previously processed based at least in part on a commit identifier (ID) associated with the commit;
    in response to the determination that the commit has not been previously processed, output the at least one obfuscated signal; and
    render a user profile for the user on a graphical user interface, wherein the user profile includes a chart showing at least one language and an associated experience and level of contribution to at least one project in the at least one language based at least in part on the determined degree of experience, wherein the level of contribution of the user is represented by a size of a shaded region in the chart and the level of contribution of the user relative to other contributors is represented by a degree of opaqueness in the shaded region.

12. A computer program product embodied in a non-transitory computer readable storage medium and comprising computer instructions for:
  obtaining a set of commits associated with a user from a source code version control system;
  extracting at least one signal from the set of commits;
  determining the user's degree of experience in a technological field based at least in part on an assigned number of points of experience in the technological field, wherein the determining of the degree of experience comprises:
    determining whether a library associated with a commit in the set of commits is related to the technological field, wherein the technological field comprises one or more of the following: computer vision, neural networks, and/or web applications, wherein the commit is input into a library classifier, which outputs the technological field, and wherein the library classifier is trained using a machine learning technique; and
    in response to a determination that the library associated with the commit is related to the technological field, determining that the user has experience in the technological field;
  obfuscating the at least one signal to disassociate the at least one signal from the commit in the set of commits;
  determining that the commit has not been previously processed based at least in part on a commit identifier (ID) associated with the commit;
  in response to the determination that the commit has not been previously processed, outputting the at least one obfuscated signal; and
  rendering a user profile for the user on a graphical user interface, wherein the user profile includes a chart showing at least one language and an associated experience and level of contribution to at least one project in the at least one language based at least in part on the determined degree of experience, wherein the level of contribution of the user is represented by a size of a shaded region in the chart and the level of contribution of the user relative to other contributors is represented by a degree of opaqueness in the shaded region.

* * * * *